US 6,678,759 B2

(12) United States Patent
Stockton et al.

(10) Patent No.: US 6,678,759 B2
(45) Date of Patent: Jan. 13, 2004

(54) GLITCH SUPPRESSION CIRCUIT AND METHOD

(75) Inventors: Grant Stockton, Lake Forest, CA (US); Michael Pilster, Long Beach, CA (US)

(73) Assignee: JSI Microelectronics, Inc., McClellan, CA (US)

( * ) Notice: Subject to any disclaimer, the term of this patent is extended or adjusted under 35 U.S.C. 154(b) by 334 days.

(21) Appl. No.: 09/915,745

(22) Filed: Jul. 26, 2001

(65) Prior Publication Data

US 2003/0023787 A1 Jan. 30, 2003

(51) Int. Cl.[7] ................................................. G06F 3/00
(52) U.S. Cl. ....................... 710/52; 326/21; 365/189.01
(58) Field of Search ............................... 710/52, 20, 57; 365/221, 219, 239, 189.01; 370/506; 375/372; 327/180, 310, 551; 326/21, 27, 86, 98

(56) References Cited

U.S. PATENT DOCUMENTS

| | | | |
|---|---|---|---|
| 4,750,149 A | 6/1988 | Miller .......................... 710/71 |
| 4,833,651 A | * 5/1989 | Seltzer et al. .......... 365/189.07 |
| 4,888,739 A | 12/1989 | Frederick et al. ........... 365/221 |
| 5,325,487 A | 6/1994 | Au et al. ..................... 711/131 |
| 5,471,583 A | 11/1995 | Au et al. ....................... 710/57 |
| 5,506,809 A | * 4/1996 | Csoppenszky et al. ....... 365/221 |
| 5,712,992 A | 1/1998 | Hawkins et al. ............... 710/57 |
| 5,850,568 A | 12/1998 | Hawkins et al. ............... 710/57 |
| 6,507,877 B1 | * 1/2003 | Ross ........................... 710/53 |
| 6,604,179 B2 | * 8/2003 | Volk et al. .................. 711/167 |

OTHER PUBLICATIONS

Joseph V. Breen, Thesis titled: "Electrically Erasable Programmable Integrated Circuits for Replacement of Obsolete TTL Logic," presented to the Faculty of the School of Engineering of the Air Force Institute of Technology, Dec. 1991.

* cited by examiner

Primary Examiner—Kim Huynh
Assistant Examiner—Harold Kim
(74) Attorney, Agent, or Firm—Baker & McKenzie

(57) ABSTRACT

A glitch suppression circuit has a read pointer and a write pointer that track memory locations. A comparator compares the read pointer and the write pointer and provides a compare signal indicative of a particular memory condition. The glitch suppression circuit includes an offset read pointer and an offset write pointer that track memory locations. An offset comparator compares the read pointer and the write pointer and provides an offset compare signal indicative of the particular memory condition. A timing signal controls a multiplexer for selecting either the compare signal or the offset compare signal and sets a logic flag. The setting of the logic flag may be synchronized to a timing signal.

20 Claims, 5 Drawing Sheets

GLITCH SUPPRESSION CIRCUIT AND METHOD

FIELD OF THE INVENTION

The present invention generally relates to electronic circuits and methods and, more specifically, to a circuit and a method that provide glitch suppression.

BACKGROUND OF THE INVENTION

A glitch is a short and unwanted signal or condition in an electronic circuit. When a glitch occurs, the electronic circuit may react in an undesirable or unpredictable manner. Accordingly, electronic circuits are generally designed to minimize the impact of glitches, either by predicting when glitches will occur and ignoring them, or by actively suppressing the glitches.

Although many types of electronic circuits are susceptible to glitch interference, the first-in, first-out (FIFO) memory device is particularly susceptible to glitches. A FIFO is an electronic circuit configured as a read-write memory. It is commonly used as a buffer to smooth the flow of data in a digital data stream. The output data are in the same order or sequence as the input data.

The FIFO circuit is particularly useful for transferring data between two circuits operating on different clocks. For example, a communication circuit may be operating at a communication clock speed and providing communication data. It may be desired to pass the communication data into a processor. However, the processor is typically operating at a processor clock speed. A FIFO circuit may be arranged to accept the communication data at the communication clock speed and send that same data to the processor at the processor speed.

Generally, the FIFO circuit includes a memory bank having many individual memory registers, each having a unique address. For example, the memory bank may be a few bytes deep or thousands of bytes deep depending upon specific applications. In operation, the FIFO memory bank accepts data under the control of memory write logic. The memory write logic writes incoming data into the memory registers at the next available address location. Simultaneously, memory read control logic is used to determine which data will be read and output from the FIFO. More specifically, the write control logic and the read control logic each have a pointer for tracking address location. Typically, these pointers are implemented as counters which increment through the available addresses of the memory device. Once a counter reaches the last available memory location in the memory, the pointer resets to the 0 location. For example, if a FIFO has 256 memory addresses, the counter will increment from 0 to 255 and then reset to 0 on the next increment. In such a manner, the 256 memory address FIFO can hold only 256 unread data points at one time. If more data is to be retained, a FIFO having a larger memory bank is needed.

Since the available memory registers are limited by the size of the memory bank, the FIFO device has logic for controlling when reads and writes may be made to the FIFO device. Typically, such control logic uses flag signals for indicating memory conditions within the FIFO. Without such flag control logic, the FIFO may not operate in an efficient and reliable manner. For example, if the incoming data is being written quickly into the FIFO memory bank, but the read circuit is operating more slowly, without a flag control the write circuit could overrun the read circuit. In such a manner, data would be lost or corrupted. More specifically, if the FIFO memory has all memory registers filled with data that has not yet been read by the read-circuit, and the write circuit is allowed to write into the memory, a memory location will be replaced without that data having been read by the read circuit. The data that was written over is thereby irrecoverably lost. Therefore, if the FIFO memory is full of unread data, the FIFO circuit provides for a flag which disables the ability of the write-control logic to write into the memory until a read function has enabled a free memory location to become available.

Referring to FIG. 6, a conventional flag control logic 200 is illustrated. The write-control logic 200 generally comprises a write pointer 202 and a read pointer 204. The values of the write pointer and a read pointer are compared by comparator 206. If the write pointer and the read pointer are compared and have the correct relationship, then a flip-flop 208 is set. The output of the flip-flop is a flag signal 209 which is then used to enable or disable memory control logic or otherwise affect system-wide logic. For example, if flag 209 is defined to be a full-flag indicating that the memory bank is full, then when the write pointer 202 is equal to the read pointer 204, the comparator 206 will cause the flip-flop 208 to set the flag 209. When the flag 209 is set, the write logic will be disabled so that no more data can be written to the FIFO memory until an additional read has been made.

Referring to FIG. 7, a timing diagram 220 for the flag logic of the conventional FIFO circuit is illustrated. The timing diagram 220 shows a write clock 222 and a read clock 224 operating asynchronously. A write pointer 226 and a read pointer 228 increment on each sequential write or read to the memory bank, respectively. A compare signal 230 is also provided which indicates when the read pointer and write pointer are in a particular relationship. The compare signal is enabled to the write clock 222 to set the flag 232 which is provided in the form of a D flip-flop.

As illustrated in FIG. 7, the comparator makes constant comparison between the write pointer 226 and the read pointer 228. If the compare circuitry is configured to identify the relationship of the write pointer 226 being equal to the read pointer 228, then the compare signal 230 should only be activated when the write pointer 226 is equal to the read pointer 228. For example, at location 234 the write pointer is set to 100 and the read pointer is set to 100, therefore the compare circuit is set high. Since the compare circuit is high, indicating that the full relationship exists in the FIFO memory, the flag 232 is also set so that the write logic is disabled. In such a manner, no more data will be written to the FIFO memory until additional reads occurred. For example, at position 236 an additional read occurs, setting the read pointer to 101; since the write pointer 226 and the read pointer 228 are no longer equal, the compare signal 230 transitions low. Synchronously with the write clock 222, the flag is removed, thereby enabling additional writes to the memory.

To avoid generating glitches in the compare line 230, the write pointer and the read pointer have counters utilizing a counting scale in which the sequential numbers differ in only one bit. An often used code is the Gray code, which provides a sequence of digital data where only one bit changes for each increment of the code. For example, the read pointer 228 is shown to go through a progression where after each read only one bit in the three-bit digital representation changes. Since only one bit changes at each increment, the risk of generating a glitch is substantially reduced.

Using a counting sequence such as the Gray code is typically difficult to implement unless the relationship between the write pointer and the read pointer is predefined. For example, the Gray code must be decoded into a format that enables the numerical difference between codes to be determined. Although it may be possible to provide decoding logic or a look-up table, the decoding process would undesirably slow the throughput of the overall FIFO circuit.

It would be highly desirable to permit the memory relationship between the read pointer and the write pointer to be programmable. In such a manner, the specific function of a flag could be adjusted for application specific purposes. To efficiently implement a programmable flag, the pointers are preferably implemented as regular binary numbers following the regular binary progression. As an illustration, FIG. 8 shows a timing diagram 240 in which the write pointer 242 and the read pointer 244 are implemented using regular binary counters. As before, the compare line 246 goes high when the write pointer 242 is equal the read pointer 244. For example, at location 249, the write pointer 242 is equal to the read pointer 244, and therefore the compare line 246 is high, and the flag 248 is set to disable further writes into memory.

However, when the read pointer 244 transitions from 001 to 010, an increment of one, there are two bits in the read pointer 244 that change. Because of the uncertainty in the value of the read pointer 244 as two bits change, a glitch 250 may be generated on the compare line 246. If the glitch occurs substantially synchronous with the write clock 222, then the full flag 248 will be set at location 252. Accordingly, during time period 254 the FIFO circuit may not allow any additional writes into FIFO memory, even though memory spaces are available. Thus, glitches in a FIFO circuit may lead to false flag conditions which cause inefficiencies and inaccuracies in the operation of the FIFO circuit. Therefore, there is a need to efficiently provide glitch suppression in a way that enables programmable flags.

SUMMARY OF THE INVENTION

It is therefore an object of the present invention to provide a circuit for efficient glitch suppression. It is another object of the present invention to provide glitch suppression in a manner that facilitates programmable flag logic. To overcome the deficiencies in the conventional circuits and methods and to achieve at least the stated objectives, a glitch suppression circuit and method are provided.

The glitch suppression circuit may include a read pointer and a write pointer that track memory locations. A comparator compares the read pointer and the write pointer and provides a compare signal indicative of a particular memory condition. The glitch suppression circuit may include an offset read pointer and an offset write pointer that track memory locations. An offset comparator compares the read pointer and the write pointer and provides an offset compare signal indicative of the particular memory condition. A timing signal controls a multiplexer for selecting either the compare signal or the offset compare signal to set a logic flag. The setting of the logic flag may be synchronized to a timing signal.

Advantageously, the disclosed flag logic enables the use of programmable flags for a memory device, including a FIFO device. Even with programmable flags, the resulting memory device is enabled to suppress the effect of glitches while operating at an efficient throughput rate. Accordingly, the memory device avoids the detrimental effect of glitches while still enabling efficient operation.

These and other features and advantages of the present invention will be appreciated from review of the following detailed description of the invention, along with the accompanying figures in which like reference numerals refer to like parts throughout.

DETAILED DESCRIPTION OF THE INVENTION

Figure 1:
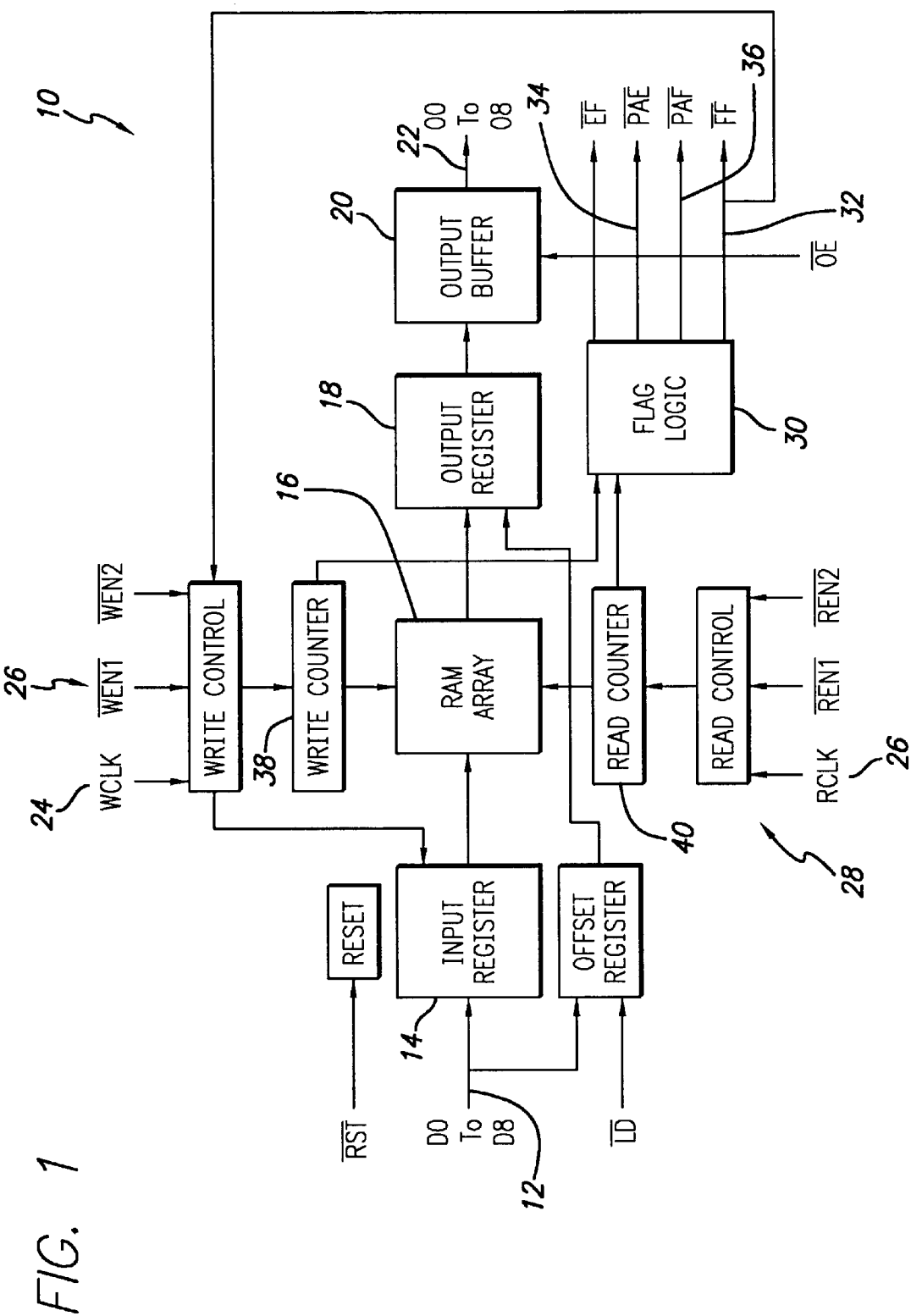
FIG. 1 is a block diagram of a first-in, first-out device in accordance with the present invention.

Referring now to FIG. 1, a first-in, first-out (FIFO) device 10 is shown. Generally, data 12 is written into the memory bank 16 synchronously with the write clock 24, while output data 22 is read from the memory bank 16 synchronously with the read clock 26. Accordingly, data is enabled to be sent between two circuits operating on separate clocks. Write-control logic 26 controls the cycle of receiving the data 12 into input register 14 and placing it into particular memory registers of the memory bank 16. In a similar manner, read-control logic 28 controls the function of reading data from a particular address out of the memory bank 16 and passing the data 22 to the output register 18 and the output buffer 20.

Flag logic 30 provides indicators of the condition of the FIFO circuit 10. For example, a full flag 32 can indicate that the memory bank 16 is full. Accordingly, the full flag 32 indicator cooperates with the write control 26 to disable the ability for additional data values 12 to be written into the memory bank 16 until additional reads have been made. It will be appreciated that although a limited number of flags are illustrated in FIG. 1, a wide variety of flags are available. For example, flag logic 30 may provide a programmable almost-empty flag 34 and a programmable almost-full flag 36. Each of these flags can be programmably defined to provide an indication when a particular memory relationship exists between the write counter 38 and the read counter 40. The programmable almost-full flag 36 may be set, for example, to indicate when the write counter 38 is a particular numerical offset (e.g., seven) from the read counter 40. In such a manner, the programmable almost-full flag 36 would send an indication to the system circuit when only seven available memory locations exist. In such a manner, the system circuit could make adjustments such as, for example, to perform read functions faster from the memory bank 16 to free up more available memory locations.

Although the above example selects the relationship between the write counter and the read counter to be set at seven, for example, it will be appreciated that the programmable almost-full flag 36 and the programmable almost-empty flag 34 could be programmed for different relationships. For example, it may be desirable to set the programmable almost empty flag to indicate when there is only one unread data point, or set the programmable almost-full flag to indicate that there is only one available memory location into which to be written. It may also be desirable that the relationship between the write counter and the read counter be changed during operation. Accordingly, the overall system circuit could set a particular relationship for a flag during one operation, and then set a different relationship when a different type of operation is being performed. Thus, the utility of the first-in, first-out buffer can be increased using the programmable flags.

Since the first-in, first-out buffer 10 has programmable flags, it is desirable that the write counter and read counter 40 use normal binary numbers following the normal binary sequence. Accordingly, the FIFO circuit 10 would be at risk for glitch interference unless additional steps are taken to suppress or compensate for glitches when comparing the write counter 38 and the read counter 40. The use of normal binary number progression also enables the fast and efficient implementation of flag logic. For example, throughput rates of at least approximately 200 MHz or more are available using glitch suppression implemented with standard binary sequencing.

Figure 2:
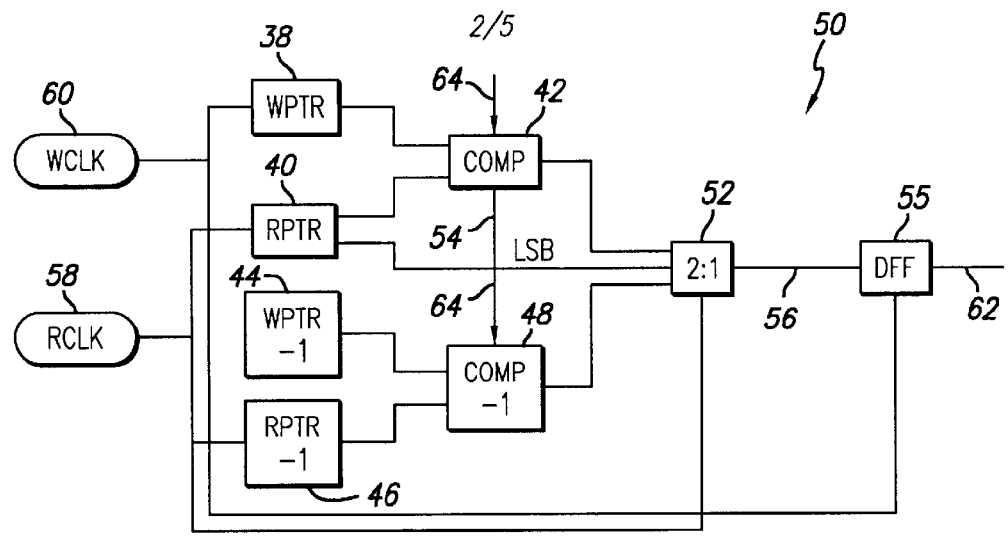
FIG. 2 is a block diagram showing flag logic for a device in accordance with the present invention.

Referring now to FIG. 2, a portion of flag logic 30 is illustrated as flag logic 50. Flag logic 50 is arranged to suppress the effect of glitches generated by compare circuitry. In flag logic 50, the write pointer 38 and the read pointer 40 are compared using compare circuitry 42. A second write pointer 44 is established that is offset numerically from the write pointer 38, and a second read pointer 46 is provided that is offset numerically from the read pointer 40. In this example, the offset pointers are offset numerically by seven, although other offsets are available. The relationship between the offset write pointer 44 and the offset read pointer 46 are compared in offset compare circuitry 48.

The outputs from the compare circuitry 42 and the offset compare circuitry 48 are received into a multiplexer 52. Multiplexer 52 accepts the two inputs and, depending upon the condition of line 54, passes one of the signals to output 56. Signal 54 may be the least significant bit (LSB) of the read pointer 40. Accordingly, the signal 54 toggles between a first state and a second state each time the read pointer 40 increments. In such a manner, the output signal 56 from the multiplexer 52 is alternated between the signal from compare circuitry 42 and the signal from offset compare circuitry 48. The multiplexer is also synchronized with the read clock so a change in the read pointer only toggles the compare inputs if the change occurs in sync with the read clock. The output signal from the multiplexer 52 is received into a flip-flop 55. The flip-flop 55 is synchronized to the write clock 60, and provides flag 62 responsive to the signal received from multiplexer 52.

In an exemplary embodiment of flag logic 50, the compare circuitry 42 and the offset compare circuitry 48 receive a relationship signal 64 which establishes the numerical offset between write pointer 38 and read pointer 40. In a similar manner, the relationship signal 64 establishes the offset between offset write pointer 44 and offset read pointer 46. Although this relationship may be static for a particular circuit, programmability provides additional flexibility and utility for the overall memory circuit.

Figure 3:
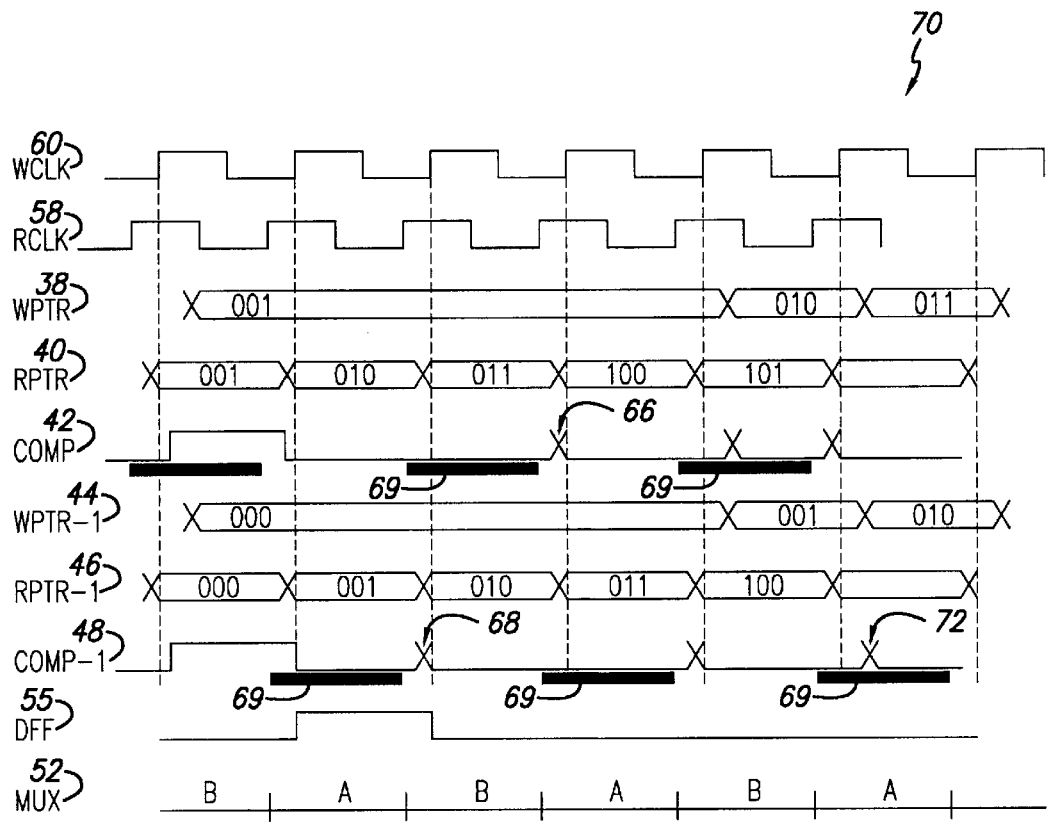
FIG. 3 is a timing diagram for the flag logic shown in FIG. 2.

Referring now to FIG. 3, timing diagram 70 illustrates select timing relationships of the flag logic 50 shown in FIG. 2. Timing diagram 70 shows write clock 60 and read clock 58 operating in an asynchronous manner. Accordingly, data is written into the memory bank synchronously with the write clock 60, and is read from the memory bank synchronously with the read clock 58. Write pointer 38 increments using standard binary numbers each time a data value is written into the memory bank, and read pointer 40 increments each time a data value is read from the memory bank.

As indicated in FIG. 3, the offset read pointer 44 is offset by one numerical value from the read pointer 38, and the offset read pointer 46 is offset one numerical value from the read pointer 40. A compare signal 42 provides an indication when the write pointer is equal to the read pointer, and the offset compare signal 48 provides an indication when the offset write pointer 44 is equal to the offset read pointer 46.

As described above, the compare signal 42 and the offset compare 48 are at risk of having glitches when the numeric value of the respective counter changes more than a single bit. For example, glitch 66 may occur because, when read pointer 40 increments one value from 011 to 100, three bits in the read pointer 40 are changed. In a similar manner, glitch 68 could occur on the offset compare write 48 because, as the offset read pointer 46 increments one value from 001 to 010, two bits are changed in the binary value.

Although glitches still may occur on the individual comparison line 42 or the individual offset comparison line 48, these glitches are avoided or suppressed due to the activity of multiplexer 52. Although glitches may still occur, the undesirable effect of the glitches is avoided. Multiplexer 52, which is responsive to the least significant bit from the read pointer 40, alternates its input from the comparison signal 42 and the offset comparison signal 48. As shown in timing diagram 70, the multiplexer 52 uses the offset compare signal 48 during time period A and uses the compare signal 42 during time period B. These time periods are indicated on timing diagram 70 by time block 69. For example, glitch 66 occurs outside of the time block 69 on compare line 42, and glitch 68 occurs outside of time block 69 on the offset compare signal 48. Accordingly, even though glitches 66 and 68 occur on the compare lines, their effect is not passed through the multiplexer 52. Importantly, output signal 56 will not reflect the effect of glitches 66 and 68.

Since the effect of glitches 66 and 68 will not affect the signal 56, the flag 62 set by the flip-flop 55 accurately reflects the memory relationship desired in the memory device. In timing diagram 70, it can also be seen that the write pointer 38 and the offset write pointer 44 are responsible for generating glitches on their respective compare lines. For example, glitch 72 is possible because the offset write pointer increments one value from 001 to 010, which is a change in two bits of the offset write pointer 44. Further, glitch 72 occurs in the time period 69 so will potentially be present on signal 56 and presented to the flip-flop 55. However, the flip-flop 55 is synchronized to the write clock 60, so the glitch will not affect the state of flag 62.

Figure 4:
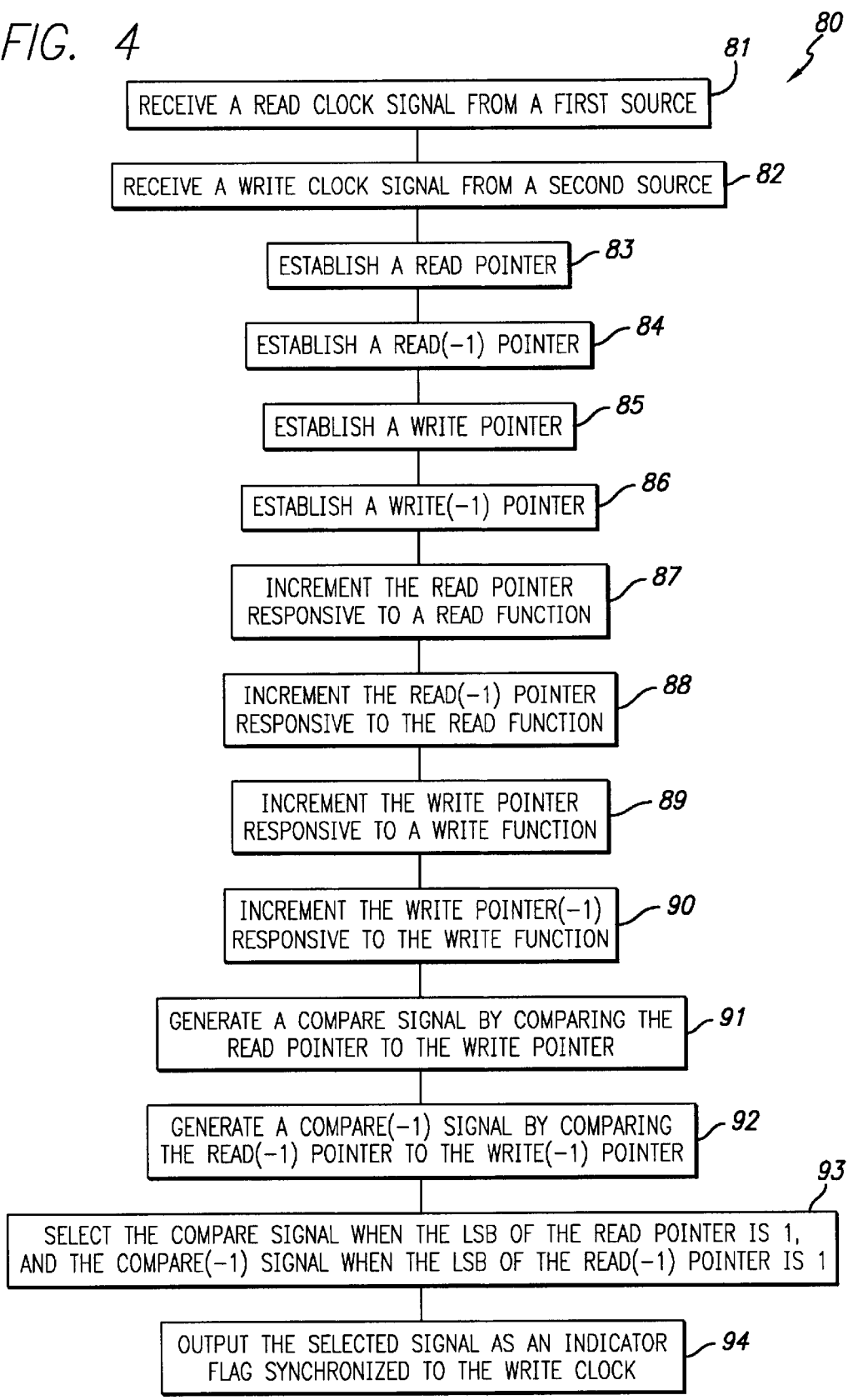
FIG. 4 is a flowchart of a method of using memory logic control in accordance with the present invention.

Referring now to FIG. 4, a method 80 of employing the flag logic 50 is described. Block 81 indicates that a read clock signal is received from a first source while block 82 shows that the write clock signal is received from a second source. In such a manner, the read clock and the write clock may be asynchronously related operating either offset in time or at different frequencies. A read counter, which may be a binary counter, is established in block 83 while an offset read pointer is established in block 84. For example, the offset read counter numerically lags the read counter by one. In a similar manner, a write pointer or counter is established in block 85 and an offset write pointer is established in block 86, for example, by a numerical offset of one.

Block 87 illustrates that the read pointer is incremented responsive to a read function and in a similar manner the offset read pointer would also be incremented responsive to that same read function as shown in block 88. Each time a new data point is written to the memory, the write pointer increments by one numeral as shown in block 89, and correspondingly the offset write pointer is also incremented by one value responsive to that same write function, as shown in block 90.

A compare signal is generated between the read pointer and the write pointer as shown in block 91. The compare signal is set either statically or programmably to respond to a target memory relationship. For example, the compare signal could be set to respond to the read pointer and the write pointer being equal, or could be set to be responsive to a particular numerical difference between the read pointer and the write pointer. This same target memory relationship is used to generate an offset compare signal by comparing the offset read pointer to the offset write pointer in block 92. Accordingly, a compare signal and an offset compare signal have been generated in the method.

In block 93, one of the compare signal or offset compare signal is selected for further use. The selection of which compare signal to use is made responsive to a timing signal. In an exemplary arrangement, the least significant bit of the read pointer is used as the timing signal. For example, the compare signal can be selected when the least significant bit of the read pointer is one, and the offset compare signal can be selected when the least significant bit of the read pointer is 0. Although an exemplary method uses the least significant bit of the read pointer as its timing signal, other timing signals may be used to accomplish the same effect. The selected compare signal is then synchronized with a write clock to generate an indicator flag as shown in block 94.

Figure 5:
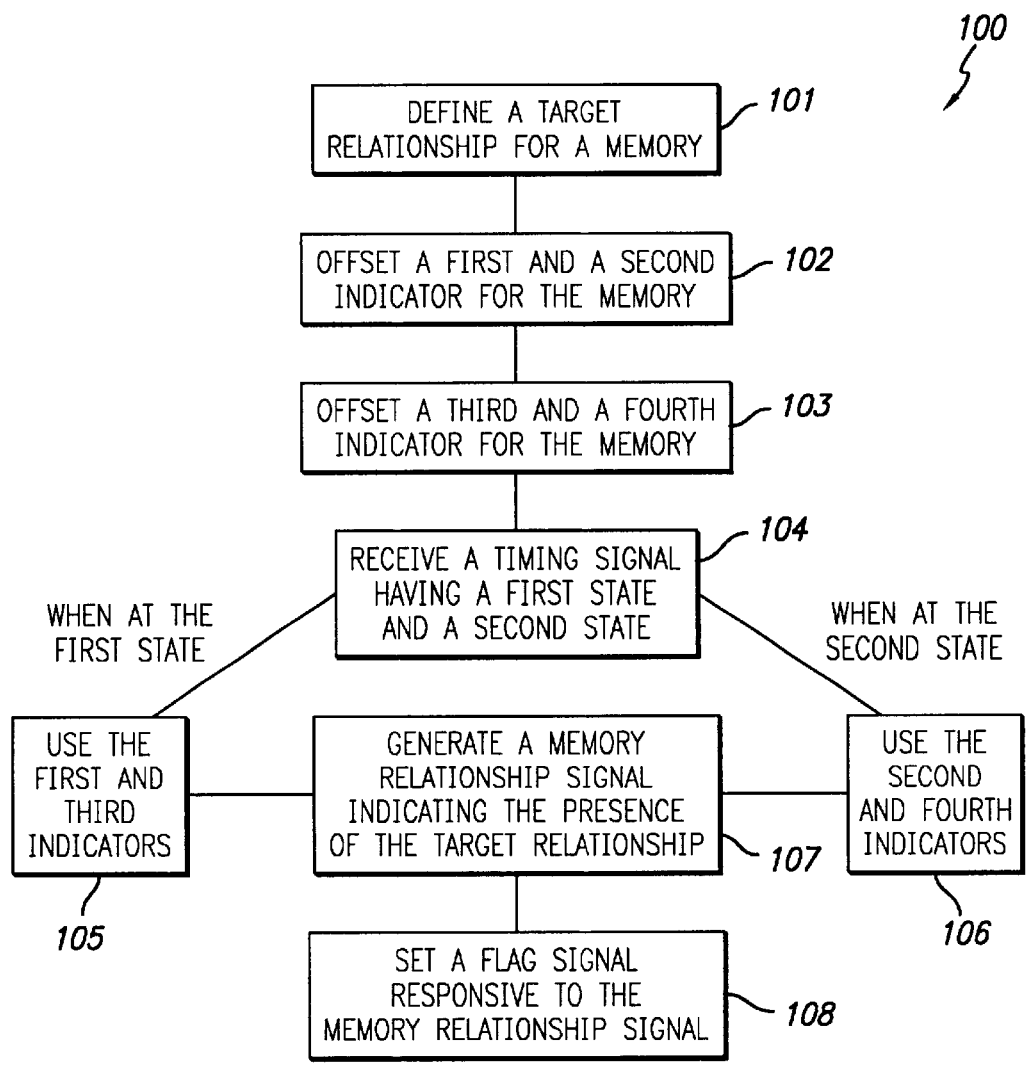
FIG. 5 is a method of setting flags for a device in accordance with the present invention.
Figure 6:
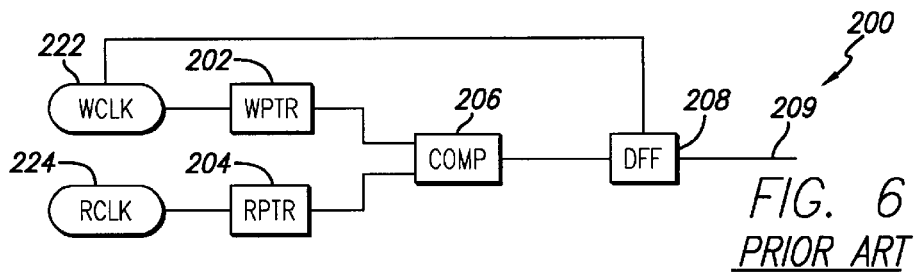
FIG. 6 is a block diagram of flag control logic for a conventional device.
Figure 7:
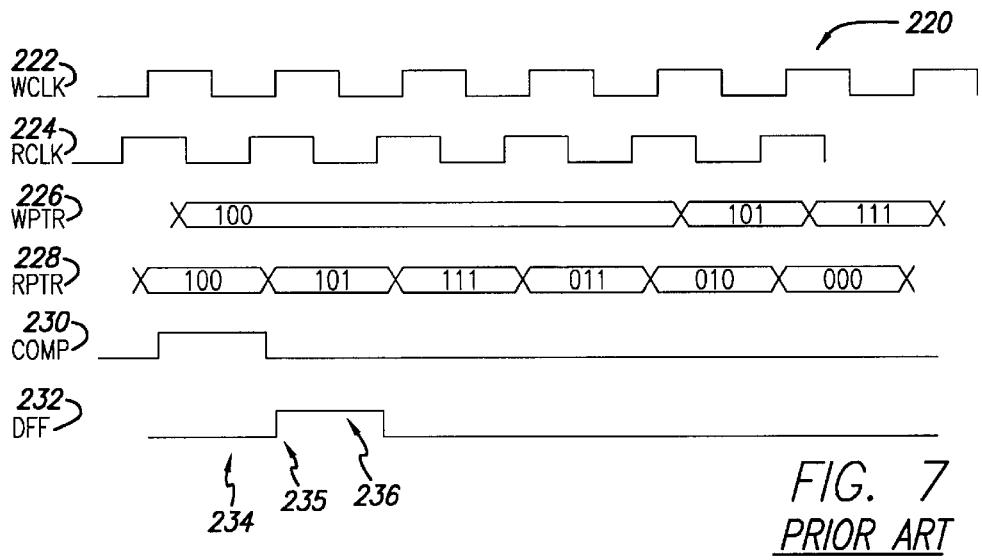
FIG. 7 is a timing diagram of the conventional device of FIG. 6.
Figure 8:
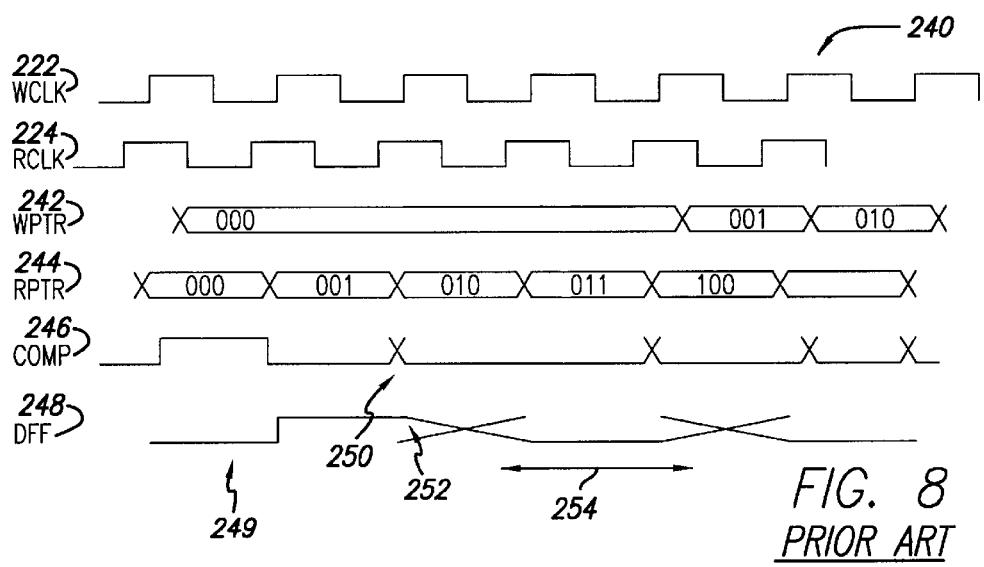
FIG. 8 is a timing diagram for the flag logic of a conventional device.

Referring now to FIG. 5, another method 100 for implementing flag logic for an electronic device is shown. Method 100 defines a target relationship for a memory in block 101. A first and second indicator are established for the memory, with the first indicator being offset from the second indicator. The first and second indicators are counters that may be offset numerically, for example, by one. In block 103, a third and fourth indicator for the memory are established, with the third and fourth indicators may also be offset by a value of one. In a specific example of the method, the first and second indicator are used to track a read memory location, while the third and fourth indicators are used to track a write memory location.

In block 104, a timing signal is received with the timing signal having a first state and a second state. If the timing signal is in the first state, then block 105 indicates that the first and third indicators will be used, while if the timing signals in the second state, then block 106 indicates the second and fourth indicators will be used. Depending upon which indicators are used, block 107 shows that a memory relationship signal may be generated when the defined target relationship exists in the memory. For example, the memory relationship signal may indicate that the memory is in a full state or that an almost full or almost empty relationship exists. With the memory relationship signal generated, a flag can be set for indicating the existence of the memory relationship to an external circuit.

Advantageously, the disclosed flag logic may enable the use of programmable flags for a memory bank, including a FIFO device. Even with programmable flags, the resulting memory bank is enabled to suppress the effect of glitches while operating at an efficient throughput rate.

Although the above discussion illustrated flags for use primarily to facilitate write control, it will be appreciated that a wide variety of signals can benefit from the use of the disclosed circuit and method. One skilled in the art will appreciate that the present invention can be practiced by other than the preferred embodiments which are presented in this description for purposes of illustration and not of limitation, and the present invention is limited only by the claims which follow. It is noted that equivalents for the particular embodiments discussed in this description may practice the invention as well.

What is claimed is:

1. A glitch suppression circuit for an electronic device, comprising:
   a read pointer;
   a write pointer;
   an offset read pointer offset from the read pointer;
   an offset write pointer offset from the write pointer;
   a comparator configured to receive a value of the read pointer and a value of the write pointer and to generate a compare signal when a defined relationship exists between the read pointer and the write pointer;
   an offset comparator configured to receive a value of the offset read pointer and a value of the offset write pointer and to generate an offset compare signal when the defined relationship exists between the offset read pointer and the offset write pointer;
   a multiplexer circuit receiving a selection signal to select either the compare signal or the offset compare signal; and
   a flag circuit configured to receive the selected signal and generate a flag signal.

2. The glitch suppression circuit according to claim 1, wherein the read pointer is configured to be offset by a value of one from the offset read pointer.

3. The glitch suppression circuit according to claim 1, wherein the write pointer is configured to be offset by a value of one from the offset write pointer.

4. The glitch suppression circuit according to claim 1, wherein the comparator is configured to receive a relationship signal, the relationship signal setting the defined relationship.

5. The glitch suppression circuit according to claim 1, wherein the multiplexer is configured to receive the selection signal in the form of a least significant bit of one of the pointers.

6. The glitch suppression circuit according to claim 1, wherein the pointers are counters configured to count in binary.

7. The glitch suppression circuit according to claim 1, wherein the flag circuit is further configured to receive a timing input.

8. The glitch suppression circuit according to claim 7 wherein the flag circuit is further configured to receive the timing circuit in the form of a write clock.

9. The glitch suppression circuit according to claim 1, wherein the multiplexer is configured to receive the selection signal in the form of a read clock.

10. The glitch suppression circuit according to claim 1, wherein the electronic device is a first-in, first-out memory device.

11. A method of suppressing a glitch in an electronic device, comprising the steps of:
    defining a target relationship for a memory;
    providing a first, a second, a third, and a fourth memory indicator;
    offsetting the first and second indicators by an offset value; the first and second indicators incrementing responsive to the same first memory condition;

offsetting the third and fourth indicators by the offset value, the third and fourth indicators incrementing responsive to the same second memory condition;

receiving a timing signal having a first state and a second state;

generating, when the timing signal is at the first state, a memory relationship signal using the first and third memory indicators, and, when the timing signal is at the second state, the memory relationship signal using the second and fourth memory indicators; and setting a flag signal responsive to the memory relationship signal.

12. The method according to claim 11, further comprising the step of:

providing a first-in, first-our memory bank.

13. The method according to claim 11, wherein the providing step includes providing the memory indicators as counters.

14. The method according to claim 11, wherein the incrementing of the memory indicators is according to normal binary progression.

15. The method according to claim 11, wherein the defining step includes defining the target relationship.

16. The method according to claim 11, further comprising the step of:

comparing the first and third memory indicators and generating a compare signal when the target relationship exists.

17. The method according to claim 11, further comprising the step of:

comparing the second and fourth memory indicators and generating an offset compare signal when the target relationship exists.

18. The method according to claim 11, further comprising the step of:

synchronizing the setting of the flag signal to a timing signal.

19. The method according to claim 18, further comprising the step of:

providing the timing signal as a write clock.

20. The method according to claim 11, further comprising the step of:

providing the memory as a memory bank in a first-in, first-out device.

* * * * *